United States Patent
Rentsch et al.

(10) Patent No.: US 9,475,943 B2
(45) Date of Patent: Oct. 25, 2016

(54) USE OF 2-AMINO-2-ETHYL-1,3-PROPANEDIOL AS ADDITIVE IN AQUEOUS SUSPENSIONS OF CALCIUM CARBONATE-COMPRISING MATERIALS WHILE MAINTAINING STABLE SUSPENSION CONDUCTIVITY

(71) Applicant: Omya International AG, Oftringen (CH)

(72) Inventors: Samuel Rentsch, Aarburg (CH); Fabio Ippolito, Oftringen (CH); Matthias Buri, Rothrist (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/897,686

(22) PCT Filed: Jul. 7, 2014

(86) PCT No.: PCT/EP2014/064480
§ 371 (c)(1),
(2) Date: Dec. 11, 2015

(87) PCT Pub. No.: WO2015/004073
PCT Pub. Date: Jan. 15, 2015

(65) Prior Publication Data
US 2016/0130444 A1    May 12, 2016

Related U.S. Application Data

(60) Provisional application No. 61/856,089, filed on Jul. 19, 2013.

(30) Foreign Application Priority Data

Jul. 12, 2013 (EP) .................................... 13176322

(51) Int. Cl.
C09C 1/02    (2006.01)

(52) U.S. Cl.
CPC ........... *C09C 1/021* (2013.01); *C01P 2006/22* (2013.01); *C01P 2006/40* (2013.01)

(58) Field of Classification Search
CPC . C09C 1/021; C01P 2006/22; C01P 2006/40
See application file for complete search history.

(56) References Cited

U.S. PATENT DOCUMENTS

| 6,666,953 | B1 | 12/2003 | Gane et al. |
| 6,991,705 | B2 | 1/2006 | Leino et al. |
| 2004/0020410 | A1 | 2/2004 | Gane et al. |
| 2006/0162884 | A1 | 7/2006 | Gane et al. |

FOREIGN PATENT DOCUMENTS

| EP | 1795502 A1 | 6/2007 |
| EP | 2070991 A1 | 6/2009 |
| EP | 2281853 A1 | 2/2011 |
| EP | 2354191 A1 | 8/2011 |
| EP | 2362435 A1 | 9/2011 |
| EP | 2392622 A1 | 12/2011 |
| WO | 0039222 A1 | 7/2000 |
| WO | 2004083316 A1 | 9/2004 |
| WO | 2009017660 A2 | 2/2009 |

OTHER PUBLICATIONS

The International Search Report dated Jul. 31, 2014 for PCT Application No. PCT/EP2014/064480.
The Written Opinion of the International Searching Authority dated Jul. 31, 2014 for PCT Application No. PCT/EP2014/064480.

*Primary Examiner* — Anthony J Green
(74) *Attorney, Agent, or Firm* — Amster, Rothstein & Ebenstein LLP

(57) ABSTRACT

Use of 2-amino-2-ethyl-1,3-propanediol as an additive in an aqueous suspension, containing from 25 to 62 vol. % of at least one calcium carbonate-comprising material, wherein the use provides improved stability with regard to the conductivity of the suspension.

33 Claims, No Drawings

USE OF 2-AMINO-2-ETHYL-1,3-PROPANEDIOL AS ADDITIVE IN AQUEOUS SUSPENSIONS OF CALCIUM CARBONATE-COMPRISING MATERIALS WHILE MAINTAINING STABLE SUSPENSION CONDUCTIVITY

CROSS-REFERENCE TO RELATED APPLICATIONS

This is a U.S. national phase of PCT Application No. PCT/EP2014/064480, filed Jul. 7, 2014, which claims priority to European Application No. 13176322.9, filed Jul. 12, 2013 and U.S. Provisional Application No. 61/856,089, filed Jul. 19, 2013.

The present invention relates to the technical domain of aqueous suspensions of calcium carbonate-comprising materials and additives added thereto.

In the preparation of aqueous suspensions of calcium carbonate-comprising materials, the skilled man is often required to select and introduce additives in order to regulate one or more characteristics of this suspension.

In making this additive selection, the skilled man must bear in mind that this additive should remain cost efficient and should not lead to unwanted interactions or effects downstream during the transportation, processing and application of this suspension.

Among the considerations of the skilled man that have rarely been addressed but which the Applicant has realised is of importance, is the selection of additives that do not cause a significant variation, and namely increase, in the electrical conductivity of the calcium carbonate-comprising material suspension but also have reduced influence on increasing the volatile organic carbon content (VOC) of the atmosphere.

Indeed, it may be advantageous to regulate aspects of the processing and transport of such a suspension based on measurements of the suspension's electrical conductivity.

For example, the flow rate of such a suspension through a given passage or unit may be controlled according to measurements made of the suspension conductivity. In the publication entitled "A Conductance Based Solids Concentration Sensor for Large Diameter Slurry Pipelines" by Klausner F et al. (J. Fluids Eng./Volume 122/Issue 4/Technical Papers), an instrument measuring the solids concentration of a slurry passing through pipelines of a given diameter based on conductance measurements is described. Based on these conductance measurements, it is possible to obtain a graphical display showing the variation of slurry concentration from the top to the bottom of the pipe, as well as the area-average concentration history.

The degree of filling of a container can likewise be managed by detecting conductivity at a given height along a container wall.

The present invention also relates to the subject of reducing the risk of corrosion of metal vessels and tanks during storage and transport by a reduction of the suspension's electrical conductivity.

However, in order to use and take advantage of such regulation systems based on measurements of electrical conductivity, VOC and low risk corrosion, the skilled man is faced with the challenge of selecting additives needed to serve at least these three functions that do not in parallel cause significant variations in the electrical conductivity values and increase VOC or risk of corrosion.

Among the functions of the additives used in calcium carbonate-comprising material suspensions, is the adjustment of the suspension pH, whether neutralisation, or alkalinisation of this suspension.

Suspension alkalinisation is notably required in order to match the pH of application environments into which the suspension is introduced, or in preparation for the addition of pH-sensitive additives. A step of raising the pH may also serve to disinfect or support the disinfection of a suspension. Adjustments to pH may be necessary to avoid the unwanted dissolution of calcium carbonate on contact with an acidic environment during processing.

Such pH adjusting additives used in aqueous suspension of calcium carbonate-comprising material suspensions and available to the skilled man are numerous.

A first group of additives that may be used to raise the pH of an aqueous suspension of calcium carbonate-comprising materials are hydroxide-containing additives, and are especially alkali and earth alkali metal hydroxides.

For example, U.S. Pat. No. 6,991,705 refers to increasing the alkalinity of a pulp suspension, which may comprise calcium carbonate, by a combination of an alkali metal hydroxide feed, such as a sodium hydroxide feed, and a carbon dioxide feed.

Potassium hydroxide, magnesium hydroxide and ammonium hydroxide are other such additives used to control the pH of a PCC suspension in a range from 10 to 13, as referred to in EP 1 795 502.

A second group of additives that may be used to raise the pH of an aqueous suspension of calcium carbonate-comprising materials are additives that do not contain hydroxide ions, but which generate such ions on reaction with water.

Such additives may be salts, such as sodium salts, of weak acids. Examples of this type of additive would include sodium acetate, sodium bicarbonate, potassium carbonate and alkaline phosphates (such as tripolyphosphates, sodium and/or potassium orthophosphates).

A further possibility is to employ nitrogen-based additives, including for example ammonia, amines and amides, in order to increase the pH of calcium carbonate-comprising material suspensions.

All of the above additives raise the pH of the aqueous suspension according to a common mechanism, which is by providing or creating, following reaction with water, hydroxide ions in the suspension.

From the literature, it is know that increasing the hydroxide ion concentration under alkaline condition leads in parallel to an increased conductivity ("Analytikum", $5^{th}$ Edition, 1981, VEB Deutscher Verlag fur Grundstoffindustrie, Leipzig, page 185-186 referring to "Konduktometrische Titration").

Given the above general knowledge documented in the literature, along with the supporting evidence that alkali and earth alkali hydroxides, as well as amines such as triethanolamine cause a significant conductivity increase in parallel to raising the pH of an aqueous suspension of calcium carbonate-comprising materials, as shown in the Examples section hereafter, the skilled man could have no expectation that the 2-amino-2-ethyl-1,3-propanediol, that raises the suspension pH according to the same mechanism as these additives, i.e. by the resulting introduction of hydroxide ions in the suspension, would even cause conductivity decrease, while he knows the granted European patents EP2281853, EP2354191 and EP2392622 disclosing alkanolamine pH regulating agents where in all these applications the charge of conductivity per pH unit is low but still positive or mostly zero as shown in Test 9 of EP 2 281 853, in Test 2 of EP 2 354 191 and in Test 2 of EP 2 392 622 and are not free of VOC.

EP2363435 describes linear or branched polyethyleneimines (PEI) as pH controllers. Such PEI's are reactive, have the ability to adsorb and modify the surface of cellulose fibres and are such used as wet-strength agent in the paper making process. Linear PEI's are insoluble in water at room temperature, a clear disadvange for easy handling when dosing very small amount of additive. Linear PEI's are soluble at room temperature in organic solvents but would be contraproductive in respect to VOC reduction.

One object of the present invention relates to the provision of an additive which allows for reducing the suspension conductivity while at the same time increasing the pH of the suspension.

A first aspect of the present application resides in the use of 2-amino-2-ethyl-1,3-propanediol as additive in an aqueous suspension containing from 25 to 62 vol. % based on the total volume of the suspension of at least one calcium carbonate-comprising material and having a pH of between 8.5 and 11, to increase the suspension pH by at least 0.3 pH units while in parallel the suspension conductivity is reduced by 5 to 100 µS/cm/pH unit.

It was entirely by surprise, and in contrast to the expectation based on common additives used to increase pH, that the Applicant identified that 2-amino-2-ethyl-1,3-propanediol with a pKa of only 8.8 (at 20° C.) can be used as an additive in an aqueous suspension having a pH of between 8.5 and 11 and containing from 25 to 62 vol. % based on the total volume of the suspension of at least one calcium carbonate-comprising material, to increase the suspension pH by at least 0.3 pH units, while reducing the suspension conductivity by 5 to 100 µS/cm/pH unit and while maintaining the aqueous calcium carbonate-comprising material suspension free of VOC.

"Conductivity" according to the present invention shall mean the electrical conductivity of an aqueous carbonate-comprising material suspension as measured according to the measurement method defined in the examples section herebelow.

For the purpose of the present invention, pH shall be measured according to the measurement method defined in the examples section herebelow.

The volume % (vol. %) of a solid material in suspension is determined according to the method defined in the examples section hereafter.

In a preferred embodiment, the said 2-amino-2-ethyl-1, 3-propanediol additive is diluted with water and added as a water based solution to the calcium carbonate-comprising material. More preferred the said 2-amino-2-ethyl-1,3-propanediol additive is made down with cold water and/or stored at room temperature.

In another preferred embodiment, the said 2-amino-2-ethyl-1,3-propanediol additive has a chemical purity of more than 90 wt.-%, preferred more than 95 wt.-%, more preferred more than 99 wt.-% in respect to 2-amino-2-ethyl-1, 3-propanediol.

In another preferred embodiment the 2-amino-2-ethyl-1, 3-propanediol has a chemical purity of at least 95 wt.-% and is dissolved in water to form a 80 wt.-% to 95 wt.-%, for example 85 wt.-% 2-amino-2-ethyl-1,3-propanediol containing water based solution.

In a preferred embodiment, the aqueous calcium carbonate-comprising material suspension has a conductivity of between 500 and 2 000 µS/cm, and preferably of between 800 and 1 300 µS/cm, prior to 2-amino-2-ethyl-1,3-propanediol addition. In another preferred embodiment, following the addition of said 2-amino-2-ethyl-1,3-propanediol, the suspension conductivity is reduced by 5 to 70 µS/cm/pH unit, and preferably by 5 to 50 µS/cm/pH unit of the suspension conductivity value after the 2-amino-2-ethyl -1,3-propanediol addition.

In another preferred embodiment, prior to addition of said 2-amino-2-ethyl-1,3-propanediol, the aqueous calcium carbonate-comprising material suspension has a pH between 9 and 10.3.

In another preferred embodiment, 2-amino-2-ethyl-1,3-propanediol is added to said suspension in an amount to increase the pH of the aqueous suspension by at least 0.4 pH units.

When the suspension pH prior to 2-amino-2-ethyl-1,3-propanediol addition is between 8.5 and 9, said 2-amino-2-ethyl-1,3-propanediol is preferably added to said suspension in an amount to increase the pH of the suspension by at least 1.0 pH unit. In the case where the suspension pH prior to 2-amino-2-ethyl-1,3-propanediol addition is between 9 and 10, said 2-amino-2-ethyl-1,3-propanediol is preferably added to said suspension in an amount to increase the pH of the aqueous suspension by at least 0.7 pH units.

Prior to 2-amino-2-ethyl-1,3-propanediol, said suspension preferably has a temperature of between 5 and 100° C., more preferably of between 35 and 85° C., and even more preferably of between 45 and 75° C.

In a preferred embodiment, said 2-amino-2-ethyl-1,3-propanediol is added to said suspension in an amount of from 500 to 15 000 mg, preferably of from 1 000 to 5 000 mg, and more preferably of 1 300 to 2 000 mg, per liter of the aqueous phase of said suspension.

As regards said calcium carbonate-comprising material in suspension, this material preferably comprises at least 50%, preferably at least 80%, and more preferably at least 98%, by weight of calcium carbonate relative to the total equivalent dry weight of said calcium carbonate-comprising material.

The calcium carbonate of said carbonate-comprising material may be a precipitated calcium carbonate (PCC), a natural ground calcium carbonate (NGCC), a surface-reacted calcium carbonate (SRCC), or a mixture thereof.

Surface-reacted calcium carbonates are understood to refer to products resulting from the reaction of a calcium carbonate with an acid and carbon dioxide, said carbon dioxide being formed in situ by the acid treatment and/or supplied externally, and the surface-reacted natural calcium carbonate being prepared as an aqueous suspension having a pH of greater than 6.0, measured at 20° C. Such products are described in, among other documents, WO 00/39222, WO 2004/083316 and EP 2 070 991, the content of these references herewith being included in the present application.

In a preferred embodiment, said suspension comprises from 45 to 60 vol. % and preferably from 48 to 58 vol. % and most preferred from 49 to 57 vol. %, of said calcium carbonate-comprising material based on the total volume of said suspension.

In another preferred embodiment, said 2-amino-2-ethyl-1,3-propanediol is added prior to, during or after, and preferably after, a step of grinding said calcium carbonate-comprising material.

It may also be advantageous that said 2-amino-2-ethyl-1, 3-propanediol be added to the dry form of said calcium carbonate-comprising material before forming said suspension of calcium carbonate-comprising material.

Following addition of said 2-amino-2-ethyl-1,3-propanediol to said suspension, the suspension may be introduced in a unit equipped with a conductivity-based regulation device.

For example, the suspension may be introduced in a container or unit up to a level determined by measurement of the suspension conductivity.

The suspension may additionally or alternatively be passed though a passage having a suspension throughput regulated as a function of the suspension conductivity.

In this respect, "passage" can relate to a confined region of throughput, as well as a throughput without any definition of confinement, i.e. after one passage of the process.

It is to be understood that the above-mentioned embodiments of the invention can be used and are contemplated to be used in combination with each other.

In view of the advantages of the use of 2-amino-2-ethyl-1,3-propanediol described above, a further aspect of the present invention refers to a method for increasing the pH of an aqueous suspension containing from 25 to 62 vol. % based on the total volume of the suspension of at least one calcium carbonate-comprising material and having a pH in the range of between 8.5 and 11 is provided, wherein the method involves the step of adding 2-amino-2-ethyl-1,3-propanediol to the suspension in an amount, so that the pH of the suspension is increased by at least 0.3 pH units, preferably by at least 0.5 or at least 0.7 pH units and, at the same time, the suspension conductivity reduction caused by the addition of 2-amino-2-ethyl-1,3-propanediol is not more than 100 μS/cm per pH unit, preferably is not more than 50 μS/cm per pH unit.

According to another embodiment of the present invention, the suspensions obtained by the inventive method or use may be used in paint and/or paper applications.

It is to be understood that the advantageous embodiments described above with respect to the inventive use of 2-amino-2-ethyl-1,3-propanediol also can be used for the inventive method. In other words, the preferred embodiments described above and any combinations of these embodiments can also be used for the inventive method.

The scope and interest of the invention will be better understood based on the following examples which are intended to illustrate certain embodiments of the invention and are non-limitative.

EXAMPLES

Measurement Methods:

Suspension pH Measurement

The pH of a suspension is measured at 25° C. using a Mettler Toledo Seven Easy pH meter and a Mettler Toledo InLab® Expert Pro pH electrode.

A three point calibration (according to the segment method) of the instrument is first made using commercially available buffer solutions having pH values of 4, 7 and 10 at 20° C. (from Aldrich).

The reported pH values are the endpoint values detected by the instrument (the endpoint is when the measured signal differs by less than 0.1 mV from the average over the last 6 seconds).

Suspension Conductivity Measurement

The conductivity of a suspension is measured at 25° C. using Mettler Toledo Seven Multi instrumentation equipped with the corresponding Mettler Toledo conductivity expansion unit and a Mettler Toledo InLab® 730 conductivity probe, directly following stirring this suspension at 1 500 rpm using a pendraulik tooth disc stirrer.

The instrument is first calibrated in the relevant conductivity range using commercially available conductivity calibration solutions from Mettler Toledo. The influence of temperature on conductivity is automatically corrected by the linear correction mode.

Measured conductivities are reported for the reference temperature of 20° C. The reported conductivity values are the endpoint values detected by the instrument (the endpoint is when the measured conductivity differs by less than 0.4% from the average over the last 6 seconds).

Particle Size Distribution (Mass % Particles with a Diameter<X) and Weight Median Grain Diameter ($d_{50}$) of Particulate Material Weight median grain diameter and grain diameter mass distribution of a particulate material are determined via the sedimentation method, i.e. an analysis of sedimentation behaviour in a gravimetric field. The measurement is made with a Sedigraph™ 5100.

The method and the instrument are known to the skilled person and are commonly used to determine grain size of fillers and pigments. The measurement is carried out in an aqueous solution of 0.1% by weight of $Na_4P_2O_7$. The samples were dispersed using a high speed stirrer and ultrasonic.

Viscosity Measurement

The Brookfield viscosity is measured after 1 minute of stirring by the use of a RVT model Brookfield™ viscometer at room temperature and a rotation speed of 100 rpm (revolutions per minute) with the appropriate disc spindle 2, 3 or 4 at room temperature.

Volume Solids (Vol. %) of a Material in Suspension

The volume solids is determined by dividing the volume of the solid material by the total volume of the aqueous suspension.

The volume of the solid material is determined by weighing the solid material obtained by evaporating the aqueous phase of suspension and drying the obtained material to a constant weight, and converting this weight value to a volume value by division with the specific gravity of the solid material.

The examples herebelow, employing a material consisting of essentially only calcium carbonate, used a specific gravity value of 2.7 g/ml, based on that listed for natural calcite in the Handbook of Chemistry and Physics (CRC Press; 60th edition), for the purpose of the above volume solids calculation.

VOC Definition According to the DIRECTIVE 2004/42/CE OF THE EUROPEAN PARLIAMENT AND OF THE COUNCIL (21 Apr. 2004)

'Volatile organic compound (VOC)' means any organic compound having an initial boiling point less than or equal to 250° C. measured at a standard pressure of 101,3 kPa;

Weight Solids (% by Weight) of a Material in Suspension

The weight solids is determined by dividing the weight of the solid material by the total weight of the aqueous suspension.

The weight of the solid material is determined by weighing the solid material obtained by evaporating the aqueous phase of suspension and drying the obtained material to a constant weight Additive Addition Amount in mg per Liter of Aqueous Phase of a Suspension In order to evaluate the amount of additive per liter of the aqueous phase of a suspension, the volume in liters (l) of the aqueous phase is first determined by subtracting the volume of the solid phase (see volume solids determination above) from the total volume of the suspension.

2-Amino-2-ethyl-1,3-propanediol (AEPD):

The below table refers to the characteristics of the additive used in the different tests according to the invention.

| Name | CAS Number | Boiling point |
|---|---|---|
| 2-Amino-2-ethyl-1,3-propanediol[1] | 115-70-8 | 274-289° C. |

[1]according to technical data sheet Angus/DOW for AEPD VOX 1000 (Form Number: 319-00923 Mar. 15, 2012 TCG)

Example 1

This example implements a natural calcium carbonate of Norwegian origin obtained by first autogeneously dry grinding 10 to 300 mm calcium carbonate rocks to a fineness corresponding to a $d_{50}$ of between 42 to 48 µm, and subsequently wet grinding this dry-ground product in water to which 0.65% by weight, based on the equivalent dry weight of the solids material, of a sodium and magnesium-neutralised polyacrylate (Mw=6 000 g/mol, Mn=2 300 g/mol), in a 1.4-liter vertical atritor mill at a weight solids content of 76.0% by weight, and recirculated through the mill until 88% by weight of the particle have a diameter <2 µm, 60.1% by weight of the particle have a diameter <1 µm and 19.8% by weight of the particle have a diameter <0.2 µm is reached.

0.4 kg of this suspension are introduced in a 1-liter beaker having a diameter of 8 cm. A pendraulik tooth disc stirrer, is introduced in the beaker such the stirrer disk is located approximately 1 cm above the bottom of the beaker. The initial suspension conductivity and pH values measured are reported in the table below.

Under stirring at 5000 rpm, the additive type (in the form of an aqueous solution) indicated in each of the tests described in the table below (PA=additive according to the prior art, IN=additive according to the present invention), is added in the indicated amount to the slurry over a period of one minute. After completed addition, the slurry is stirred for an additional 5 minutes, after which time the suspension pH and the conductivity are measured.

TABLE 2

| Test | | Suspension volume solid content (vol. %) | Initial suspension conductivity (+/−10 µS/cm) and pH (+/− 0.1) | Additive Type (in solution)/ Solution concentration | Additive addition amount (mg/L of aqueous phase) | Conductivity (+/−10 µS/cm) and pH after additive addition | Δ Conductivity per pH |
|---|---|---|---|---|---|---|---|
| 1 | PA | 54.0 | 889 µS/cm pH 8.8 | KOH/ 30% | 3473 | 1528 µS/cm pH 12.7 | +163 |
| 2 | IN | 54.0 | 889 µS/cm pH 8.8 | AEPD | 31666 | 825 µS/cm pH 10.3 | −43 |

Differences in the pH, conductivity and viscosity of the initial suspension are due to aging effects of the suspension.

Further detailed experimental results are given in the table below.

TABLE 3

| Test | AEPD addition amount (mg/L of aqueous phase) | Brookfield viscosity Pas at 23° C. ± 2° C. | pH at 23° C. ± 2° C. | Δ Conductivity per pH unit |
|---|---|---|---|---|
| blind | 0 | 124 | 8.8 | |
| 3 (IN) | 1266 | 119 | 9.1 | −7 |
| | 3166 | 120 | 9.4 | −47 |
| | 18996 | 119 | 10.2 | −46 |

The results of the above table show that the objectives and advantages of the present invention (especially the reduced conductivity) and constant viscosity are obtained by the using of the inventive 2-amino-2-ethyl-1,3-propanediol

The invention claimed is:

1. A method for increasing the pH of an aqueous suspension containing from 25 to 62 vol. % based on the total volume of the suspension of at least one calcium carbonate-comprising material and having a pH in the range of between 8.5 and 11, comprising adding 2-amino-2-ethyl-1,3-propanediol to the suspension in an amount so that the pH of the suspension is increased by at least 0.3 pH units and the suspension conductivity is reduced by not more than 100 µS/cm per pH unit.

2. The method according to claim 1, wherein 2-amino-2-ethyl-1,3-propanediol is added as a water based solution to the calcium carbonate-comprising material.

3. The method according to claim 1, wherein 2-amino-2-ethyl-1,3-propanediol has a chemical purity of more than 90 wt.-%.

4. The method according to claim 1, wherein 2-amino-2-ethyl-1,3-propanediol has a chemical purity of more than 95 wt.-%.

5. The method according to claim 1, wherein 2-amino-2-ethyl-1,3-propanediol has a chemical purity of more than 99 wt.-%.

6. The method according to claim 1, wherein 2-amino-2-ethyl-1,3-propanediol has a chemical purity of at least 95 wt.-% and is dissolved in water to form a 80 wt.-% to 95 wt.-% 2-amino-2-ethyl-1,3-propanediol containing water based solution.

7. The method according to claim 1, wherein the suspension has a conductivity of between 500 and 1300 µS/cm prior to 2-amino-2-ethyl-1,3-propanediol addition.

8. The method according to claim 1, wherein the suspension has a conductivity of between 1800 and 1300 µS/cm prior to 2-amino-2-ethyl-1,3-propanediol addition.

9. The method according to claim 1, wherein following addition of 2-amino-2-ethyl-1,3-propanediol, the suspension conductivity is reduced by 5 to 70 µS/cm/pH unit.

10. The method according to claim 1, wherein following addition of 2-amino-2-ethyl-1,3-propanediol, the suspension conductivity is reduced by 5 to 50 µS/cm/pH unit.

11. The method according to claim 1, wherein prior to addition of 2-amino-2-ethyl-1,3-propanediol, the suspension has a pH between 9 and 10.3.

12. The method according to claim 1, wherein 2-amino-2-ethyl-1,3-propanediol is added to the suspension in an amount to increase the pH of the suspension by at least 0.4 pH units.

13. The method according to claim 1, wherein 2-amino-2-ethyl-1,3-propanediol is added in an amount of from 500 to 15000 mg per liter of the aqueous phase of the suspension.

14. The method according to claim 1, wherein 2-amino-2-ethyl-1,3-propanediol is added in an amount of from 1000 to 5000 mg per liter of the aqueous phase of the suspension.

15. The method according to claim 1, wherein 2-amino-2-ethyl-1,3-propanediol is added in an amount of from 1300 to 2000 mg per liter of the aqueous phase of the suspension.

16. The method according to claim 1, wherein when the pH of the suspension prior to 2-amino-2-ethyl-1,3-propanediol addition is between 8.5 and 9,2-amino-2-ethyl-1,3-propanediol is added to the suspension in an amount to increase the pH of the suspension by at least 1.0 pH unit, and when the pH of the suspension prior to 2-amino-2-ethyl-1,3-propanediol addition is between 9 and 10, 2-amino-2-ethyl-1,3-propanediol is added to the suspension in an amount to increase the pH of the suspension by at least 0.7 pH units.

17. The method according to claim 1, wherein prior to 2-amino-2-ethyl-1,3-propanediol addition the suspension has a temperature of between 5 and 100° C.

18. The method according to claim 1, wherein prior to 2-amino-2-ethyl-1,3-propanediol addition the suspension has a temperature of between 35 and 85° C.

19. The method according to claim 1, wherein prior to 2-amino-2-ethyl-1,3-propanediol addition the suspension has a temperature of between 45 and 75° C.

20. The method according to claim 1, wherein the calcium carbonate-comprising material comprises at least 50 % by weight of calcium carbonate relative to the total weight of the calcium carbonate-comprising material.

21. The method according to claim 1, wherein the calcium carbonate-comprising material comprises at least 80 % by weight of calcium carbonate relative to the total weight of the calcium carbonate-comprising material.

22. The method according to claim 1, wherein the calcium carbonate-comprising material comprises at least 98 % by weight of calcium carbonate relative to the total weight of the calcium carbonate-comprising material.

23. The method according to claim 1, wherein the calcium carbonate of the calcium carbonate-comprising material is a precipitated calcium carbonate (PCC), a natural ground calcium carbonate (NGCC), a surface-reacted calcium carbonate (SRCC), or any mixture thereof.

24. The method according to claim 1, wherein the suspension comprises from 45 to 60 vol. % of the calcium carbonate-comprising material based on the total volume of the suspension.

25. The method according to claim 1, wherein the suspension comprises from 48 to 58 vol. % of the calcium carbonate-comprising material based on the total volume of the suspension.

26. The method according to claim 1, wherein the suspension comprises from 49 to 57 vol. % of the calcium carbonate-comprising material based on the total volume of the suspension.

27. The method according to claim 1, wherein 2-amino-2-ethyl-1,3-propanediol is added prior to, during, or after, a step of grinding the calcium carbonate-comprising material.

28. The method according to claim 1, wherein 2-amino-2-ethyl-1,3-propanediol is added after a step of grinding the calcium carbonate-comprising material.

29. The method according to claim 1, wherein 2-amino-2-ethyl-1,3-propanediol is added to a dry form of the calcium carbonate-comprising material, before forming the suspension of calcium carbonate-comprising material.

30. The method according to claim 1, wherein following addition of 2-amino-2-ethyl-1,3-propanediol to the suspension, the suspension is introduced in a unit equipped with a conductivity-based regulation device.

31. The method according to claim 1, wherein following addition of 2-amino-2-ethyl-1,3-propanediol to the suspension, the suspension is introduced in a container or unit up to a level determined by measurement of the suspension conductivity.

32. The method according to claim 1, wherein following addition of 2-amino-2-ethyl-1,3-propanediol to the suspension, the suspension is passed though a passage having a suspension throughput regulated as a function of the suspension conductivity.

33. The method according to claim 1, wherein the suspension obtained by the method is used in paint and/or paper applications.

* * * * *